US008395792B2

(12) United States Patent
    Ido

(10) Patent No.: US 8,395,792 B2
(45) Date of Patent: Mar. 12, 2013

(54) IMAGE DATA PROCESSING APPARATUS CONNECTABLE TO A NETWORK

(75) Inventor: Kazuhiko Ido, Osaka (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 372 days.

(21) Appl. No.: 12/658,843

(22) Filed: Feb. 16, 2010

(65) Prior Publication Data

US 2010/0214591 A1    Aug. 26, 2010

(30) Foreign Application Priority Data

Feb. 24, 2009    (JP) .................................. 2009-040186

(51) Int. Cl.
    *G06K 15/02*    (2006.01)
    *G06F 3/12*    (2006.01)
(52) U.S. Cl. ....................... 358/1.14; 358/1.15
(58) Field of Classification Search ................. 358/1.14, 358/1.15
    See application file for complete search history.

(56) References Cited

U.S. PATENT DOCUMENTS

| 6,864,922 | B2 | 3/2005 | Yang et al. |
| 2002/0015180 | A1* | 2/2002 | Tominaga ..................... 358/1.15 |
| 2006/0170964 | A1* | 8/2006 | Matsuda ....................... 358/1.15 |
| 2007/0280131 | A1 | 12/2007 | Matsuba |
| 2008/0082702 | A1 | 4/2008 | Ohtsu |
| 2008/0198408 | A1* | 8/2008 | Sugiura ........................ 358/1.15 |
| 2008/0285074 | A1* | 11/2008 | Wilson ......................... 358/1.15 |
| 2009/0021782 | A1 | 1/2009 | Morimoto |
| 2009/0059281 | A1 | 3/2009 | Murahashi et al. |

FOREIGN PATENT DOCUMENTS

| JP | 6-314248 A | 11/1994 |
| JP | 7-170379 A | 7/1995 |
| JP | 2001-071593 A | 3/2001 |
| JP | 2002-373070 A | 12/2002 |
| JP | 2003-186639 A | 7/2003 |
| JP | 2003-208289 A | 7/2003 |
| JP | 2003-237186 A | 8/2003 |
| JP | 2003271342 A | 9/2003 |
| JP | 2006065791 A | 3/2006 |
| JP | 2007018152 A | 1/2007 |
| JP | 2007-079902 A | 3/2007 |
| JP | 2007241414 A | 9/2007 |
| JP | 2007-300500 A | 11/2007 |
| JP | 2008-011372 A | 1/2008 |
| JP | 2008-083957 A | 4/2008 |
| JP | 2008-117021 A | 5/2008 |
| JP | 2009-025952 A | 2/2009 |
| JP | 2009-148909 A | 7/2009 |

OTHER PUBLICATIONS

Machine translation for JP2003-271342 (IDS).*

* cited by examiner

*Primary Examiner* — Qian Yang
(74) *Attorney, Agent, or Firm* — Edwards Wildman Palmer LLP; David G. Conlin; David J. Silvia

(57) ABSTRACT

A control unit of an image data processing apparatus executes a program including the step (S1030) of calculating a hash value based on image data received from an image processing terminal; the step (S1070) of issuing, if the same document (image) has already been printed by a user of the same group (YES at S1040, YES at S1050 and YES at S1060), a notice to that effect to the user who requested print registration; and the step (S1090) of registering the hash value and a user ID, if continuation of registration is still requested.

11 Claims, 7 Drawing Sheets

FIG. 3

| USER ID | USER NAME | GROUP ID |
|---------|-----------|----------|
| 000001  | USER A    | 001      |
| 000002  | USER B    | 001      |
| 000003  | USER C    | 001      |
| 000004  | USER D    | 001      |
| 000005  | USER E    | 001      |
| 000010  | USER F    | 002      |
| 000011  | USER G    | 002      |
| ...     | ...       | ...      |
| ...     | ...       | ...      |

FIG. 4

"DOCUMENT A"

| HUSH VALUE | USER ID | PRINT-COMPLETE INFO |
|---|---|---|
| de6f0975bd22fffb2df7a3d307c268ce50fa7da | 000002 | PRINTED |
| b2598baea5396987bb47271fcdff040dc54eb1e9 | 000003 | PRINTED |
| 7135eb40b05f0aec31b2153cffc7472173e0c62f | 000011 | NOT-YET |
| 70e3055fd87c7fb0caee782b26ee5a8795a05fc1 | 000002 | PRINTED |
| b5e4e812301d95273e3db22a186cd28c9cad9b63 | 000009 | PRINTED |
| b2598baea5396987bb47271fcdff040dc54eb1e9 | 000003 | NOT-YET |
| ... | ... | ... |
| ... | ... | ... |
| ... | ... | ... |

FIG. 7

* ALARM *
"DOCUMENT A" REQUESTED BY USER A FOR PRINTING IS ALREADY PRINTED BY USER B OF THE SAME GROUP.

CONTINUE PRINT REGISTRATION OF "DOCUMENT A"?

| YES | NO |

IMAGE DATA PROCESSING APPARATUS CONNECTABLE TO A NETWORK

CROSS-REFERENCE TO RELATED APPLICATION

This nonprovisional application claims priority under 35 U.S.C. §119(a) on Patent Application 2009-040186 filed in Japan on Feb. 24, 2009, the entire contents of which are hereby incorporated by reference.

BACKGROUND OF THE INVENTION

1. Field of the Invention

The present invention relates to an image processing apparatus that stores an image formed, for example, by a personal computer, as an image data file (document file) until it is printed by an image forming apparatus connected through a network and, more specifically, to an image data processing apparatus that does not necessitate increase in image memory capacity and effectively avoids accumulative printing of the same image.

2. Description of the Background Art

Recently, a print service is available by which a print request is issued to a network service and printing can be done by an arbitrary image forming apparatus (printer) connected to the network. More specifically, by the print service, when printing is to be done from an image processing terminal such as a personal computer (hereinafter denoted as a "PC"), image data is once stored in a server and a print request is made from any of a plurality of image forming apparatuses connected to the network, whereby printing can be done from any of the image forming apparatuses.

In such a print service, considering image memory capacity of a shared server or from security concerns, the image data printed upon request from the image forming apparatus is deleted from the server.

A log information management system for generating and managing log information for monitoring wrongful image formation in such a print system is disclosed in Japanese Patent Laying-Open No. 2007-079902 (Document 1).

The log information management system includes: image processing means for performing a process on data of an image; image data generating means for generating image data from data of the image; unique number generating means for generating a unique number corresponding to the image data generated by the image data generating means; job information generating means for monitoring process status of the image processing means and for generating job information; log information generating means for generating log information including job information, image data and the unique number; log information storage means for storing the log information; determining means for determining, every time the unique number generating means generates a unique number, whether or not the same unique number exists in the log information stored in the log information storage means; and log information changing means for deleting image data from the log information generated by the log information generating means if the determination by the determining means is positive. The log information storage means is characterized in that when the log information with the image data deleted is stored, it is related to log information having the same unique number as the unique number included in the subject log information.

According to the log information management system, every time a unique number is generated by the unique number generating means, whether the same unique number as the generated unique number exists in the log information storage means is determined by the determining means, and if the same unique number exists, the image data is deleted from the generated log information by the log information changing means, and the resulting log information is stored in correspondence with the unique number stored in the log information storage means. This prevents storage of image data derived from the same image in the log information storage means, and hence, storage capacity for the log information in the storage means can be saved.

Though not directly related to the print service, an image response system allowing sharing of image information by a plurality of terminals on a network and thereby alleviating economic burden on the user derived from facility cost is disclosed in Japanese Patent Laying-Open No. 7-170379 (Document 2).

The image response system is formed of terminals displaying and outputting image information; a plurality of image servers with which various pieces of image information is registered; and an image exchanger connecting the image file servers with a terminal through a communication line; in which a prescribed image file server is connected to a terminal in response to a request from the terminal through the image exchanger, so that prescribed image information registered in the image file server is transmitted and output to the terminal. The system is characterized by a customer premises image storage device accommodating a plurality of terminals, having image information accumulating means connected to the image exchanger for accumulating pieces of image information, and control means for accessing to a prescribed image file server through the communication line and the image exchanger in response to an image accumulation request from each terminal, receiving prescribed image information from the image file server and accumulating the information in the image accumulating means, and for transmitting and outputting requested image information, in response to an image transmission request from each terminal, from the image accumulating means to the terminal.

According to the image response system, the control means accesses to a prescribed image file server through the communication line and the image exchanger in response to an image accumulation request from each terminal, prescribed image information is received from the image file server and accumulated in the image accumulating means, and the requested image information is transmitted and output from the image accumulating means to the terminal in response to the image transmission request from each terminal. The customer premises device allows sharing of image information by a plurality of terminals, so that the image accumulating means that was conventionally provided for each terminal becomes unnecessary. Thus, economical burden on the user derived from facility cost can be reduced.

SUMMARY OF THE INVENTION

The technique disclosed in Document 1, however, is simply to prevent repeated registration (storage) of image data that has already been registered (stored) using a hash value, in order to enable efficient use of a memory storing the image data. Therefore, when there is a print request for the same image data, printing process takes place. This means that even if a user belonging to a same group (for example, same division or section of a corporate office) has already completed a printing process, repeated printing is accepted. Thus, it follows that printing is done even if printing is actually unnecessary, wasting the running cost of the image forming apparatus and the cost of recording paper. The technique disclosed in Document 2 is not focused on such wasteful printing, and it is directed simply to the sharing of image data by a plurality of terminals.

Further, in the print service described above, the image data is deleted after printing and, therefore, it is impossible to confirm what image data was printed in the past.

It is noted that a technique referred to as "job log" for storing print job history in a general image forming apparatus has been known. Though this technique allows storage of user name, date and time of printing, file name and the like, it is impossible to determine only from the file name if the image data is the same.

Therefore, an object of the present invention is to provide an image data processing apparatus that does not necessitate increase in image memory capacity and effectively avoids accumulative printing of the same image, when image data is transmitted from an image processing terminal such as a PC through a network to the image data processing apparatus on the network, and printing process is executed when a print request command is issued from an image forming apparatus (printer) to the image data processing apparatus.

According to the present invention, an image data processing apparatus is used in a print system in which image data to be printed is transmitted from an image processing terminal to the image data processing apparatus on a network, and printing process is executed by an image forming apparatus when a print request command is issued from the image forming apparatus to the image data processing apparatus. The image data processing apparatus includes: a data storage unit storing image data received from the image processing terminal; a generating unit generating identification data enabling unique identification of the image data, based on the stored image data; an information storage unit storing the identification data in relation to user information identifying a user who requested printing process of the image data from which the identification data is derived and print information indicating whether or not printing has been done; and a control unit, upon reception of the image data from the image processing terminal, for generating the identification data from the image data, and if the generated identification data is stored in the information storage unit and printing has already been done, issuing alarm information to the image processing terminal so that an alarm is output on the image processing terminal.

By the image data processing apparatus, if the same document (image) has already been printed in the print system, a notice to that effect is given to a user who requested printing. Specifically, alarm information for outputting an alarm is output to the image processing terminal (for example, displayed on a monitor). Receiving such an alarm, the user may refrain from printing, since it may be sufficient to refer to the previously provided print-out if the purpose is just a rough confirmation of printed image (color, tone and overall balance). Here, by not storing the image data, capacity of the image memory can be saved. By such an approach, it is possible to effectively prevent accumulative printing of the same images in a print system by which a large number of documents (images) are printed by a large number of users. Thus, wasteful printing can be prevented and provision of an image memory of large capacity becomes unnecessary.

The generation unit may generate the identification data from the image data, using a one-way function. Here, the one-way function may be a hash function. Further, the generation unit may generate, if the image data contains a plurality of pages, a hash value calculated by using the hash function for each page, as the identification information.

Since hash function, which is a one-way function, is used, it is possible to determine whether the image data is the same, even after the original image data is deleted. Further, from the hash value calculated by the one-way function, the original image data cannot be estimated and, hence, when the original image data is deleted, security is ensured. Further, even if the image data contains a plurality of pages, it is possible to determine whether the image data is the same, using the hash function as such.

The image data processing apparatus may further include a unit for storing a group to which the user belongs. The control unit may include a unit that issues the alarm information to the image processing terminal, if the generated identification data is stored in the information storage unit and printing has been already done by a user of the same group. Further, the alarm information may indicate that printing has been done by a user belonging to the same group.

By the image data processing apparatus, if the same document (image) has already been printed in the print system by a user belonging to the same group, a notice to that effect is given to a user who requested printing. Receiving such a notice, the user may refrain from printing, since it may be sufficient to refer to the user nearby for the previously provided print-out if the purpose is just a rough confirmation of the printed image. It is often the case that the user belonging to the same group stays nearby and, hence, there is a good chance that the printed image is readily available for reference. By such an approach, it is possible to effectively prevent accumulative printing of the same images in a print system by which documents (images) are printed by a large number of users belonging to the same group. Thus, wasteful printing can be prevented and provision of an image memory of large capacity becomes unnecessary.

The alarm information may be configured to allow input as to whether or not processing is to be continued. The image data processing apparatus may further include a unit controlling the information storage unit such that, when a reply to continue processing is received, the identification data is stored in relation to user information and print information, in the information storage unit. In that case, the print information may indicate that printing is not yet done.

If the user who received the alarm on the image processing terminal still wishes to print the document that has already been printed previously, he/she transmits a reply to continue the process, to the image data processing apparatus. If such a reply is received, identification data is stored in relation to the user information and the print information in accordance with the user's request, allowing printing by the image forming apparatus. Thus, accumulative printing of the same image can be prevented while user's request is taken into account.

The alarm information may be configured to allow input as to whether or not processing is to be continued. The image data processing apparatus may further include a unit for deleting image data stored in the data storage unit, when a reply not to continue processing is received.

If the user who received the alarm on the image processing terminal does not wish to print the document that has already been printed previously, he/she transmits a reply not to continue the process, to the image data processing apparatus. If such a reply is received, printing process by the user is unnecessary, and therefore, stored image data is deleted. Thus, accumulative printing of the same image can be prevented while user's request is taken into account, and provision of an image memory of large capacity becomes unnecessary.

The image data processing apparatus may further include a unit for transmitting, when a print request is received from the image forming apparatus, the image data stored in the data storage unit to the image forming apparatus that has transmitted the print request, and deleting the image data stored in the data storage unit after transmission.

After the image data is transmitted to the image forming apparatus, the image data that has been stored is deleted, for example, to ensure security. Even in that case, print history (identification data as one-way functional value, user information and print information) is stored. The identification data, which is given as one-way functional value, has significantly smaller capacity than the original image data. By such an approach, it becomes possible to determine whether the image data is the same, even after the original image has been deleted, when there is a print request for the same document, while provision of an image memory of large capacity becomes unnecessary.

The image data processing apparatus may further include a unit for transmitting, when a print request is received from the image forming apparatus, the image data stored in the data storage unit to the image forming apparatus that has transmitted the print request, and changing the print information that printing is not yet done to information that printing has been done after transmission.

Even after the image data is deleted, whether or not the image data has been already printed can be determined when a print request for the same document is made later, since the print history (identification data as one-way functional value, user information and print information) is stored.

According to the present invention, in a print system in which image data is transmitted from an image processing terminal through a network to the image data processing apparatus on the network, and printing process is executed when a print request command is issued from an image forming apparatus to the image data processing apparatus, an image data processing apparatus that does not necessitate increase in image memory capacity and effectively avoids accumulative printing of the same image can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 shows a user information storage table stored in a user information storage unit 154 shown in FIG. 2.

FIG. 4 shows a hash log storage table stored in user information storage unit 154 shown in FIG. 2.

FIG. 7 shows an example of the image displayed on the image processing terminal shown in FIG. 1.

DESCRIPTION OF THE PREFERRED EMBODIMENTS

Figure 1:
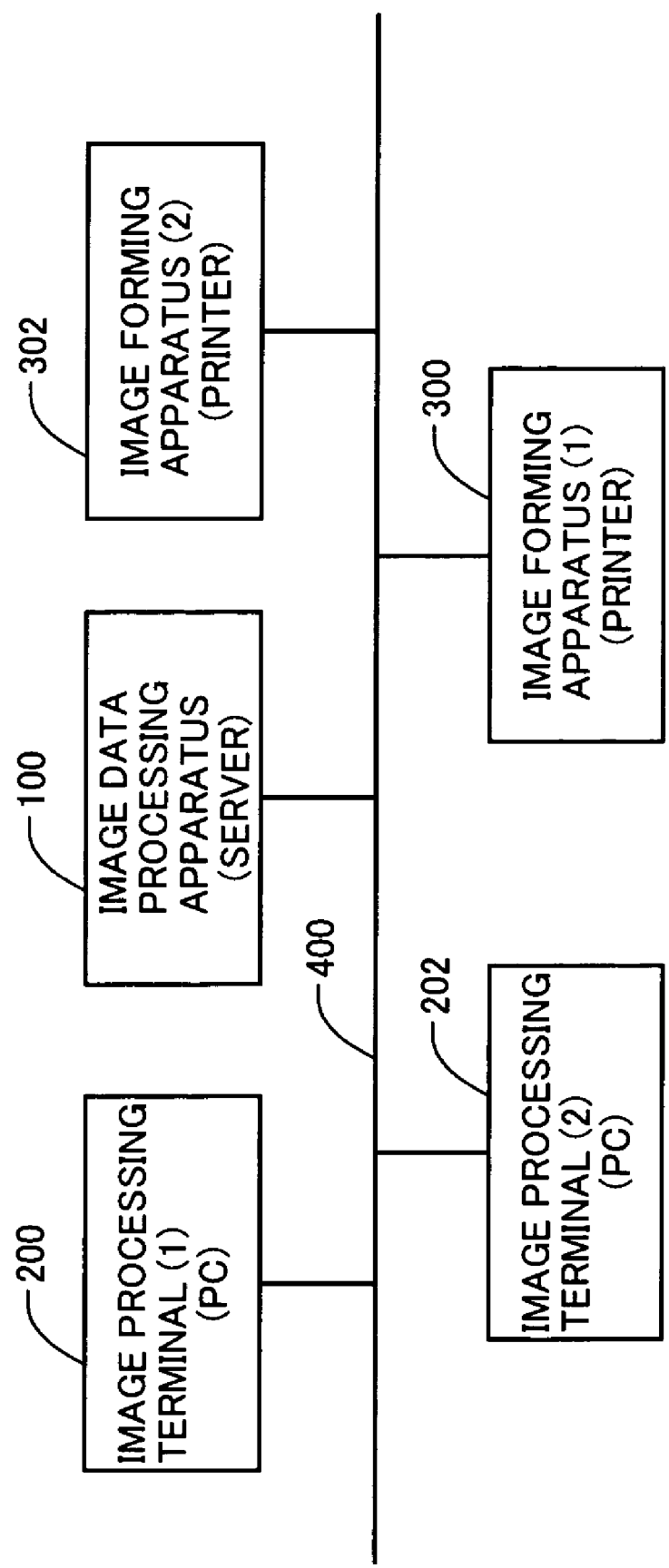
FIG. 1 shows an overall configuration of the image print system in accordance with an embodiment of the present invention.

In the embodiment below, the same components are denoted by the same reference characters. Their functions and names are also the same. Therefore, detailed description thereof will not be repeated. In the following, a print service system including an image processing terminal (PC) on which a user forms and edits image data, an electrophotographic type image forming apparatus (printer), and an image data processing apparatus (server) responsive to reception of a print request from the image forming apparatus (printer) for transmitting image data that has been transmitted from the image processing terminal (PC) and stored, to the image forming apparatus (printer), will be described. The present invention, however, is not limited to the above, and the invention is applicable to any print service system that includes an image processing terminal, an image forming apparatus and an image data processing apparatus on a network. Further, a document file and an image data file are considered substantially the same unless these files are described explicitly distinguished from each other (basically, such a situation is not expected in the present invention). As can be readily understood from the fact that the image forming apparatus prints information including characters, the concept of "image" involves characters. Therefore, the concept of a "document" involves not only texts but also images.

[Overall System Configuration]

FIG. 1 shows an overall configuration of the print service system including an image processing terminal (PC), an image forming apparatus (printer) and an image data processing apparatus (server).

As shown in FIG. 1, the print service system includes: an image processing terminal (1) 200 and an image processing terminal (2) 202 each implemented, for example, by a PC (hereinafter referred to as an "image processing terminal 200"); an image forming apparatus (1) 300 and an image forming apparatus (2) 302 (hereinafter referred to as an "image forming apparatus 300") for forming an image on a sheet of recording paper by, for example, electrophotographic printing method; an image data processing apparatus 100; and an LAN (Local Area Network) line 400 for network-connection of these apparatuses. The number of image processing terminals 200 and the number of image forming apparatuses 300 are each not limited to two.

Image data processing apparatus 100 realizing the characteristic function of the present invention transmits, in response to a print request from image forming apparatus 300, image data that has been transmitted from image processing terminal 200 and stored, to the image forming apparatus 300. In this regard, image data processing apparatus 100 executes an image data registration process of storing the image data transmitted from image processing terminal 200, and a print process of transmitting, in response to the print request received from image forming apparatus 300, the stored image data to the image forming apparatus 300.

Specifically, in the print service system shown in FIG. 1, when a print request command is issued by the user from image processing terminal 200, the image data is once stored in image data processing apparatus 100. Then, in response to the print request from image forming apparatus 300 connected to LAN line 400, the image data stored in image data processing apparatus 100 is transmitted to image forming apparatus 300, and by image forming apparatus 300, printing is executed.

[Hardware Block]

Figure 2:
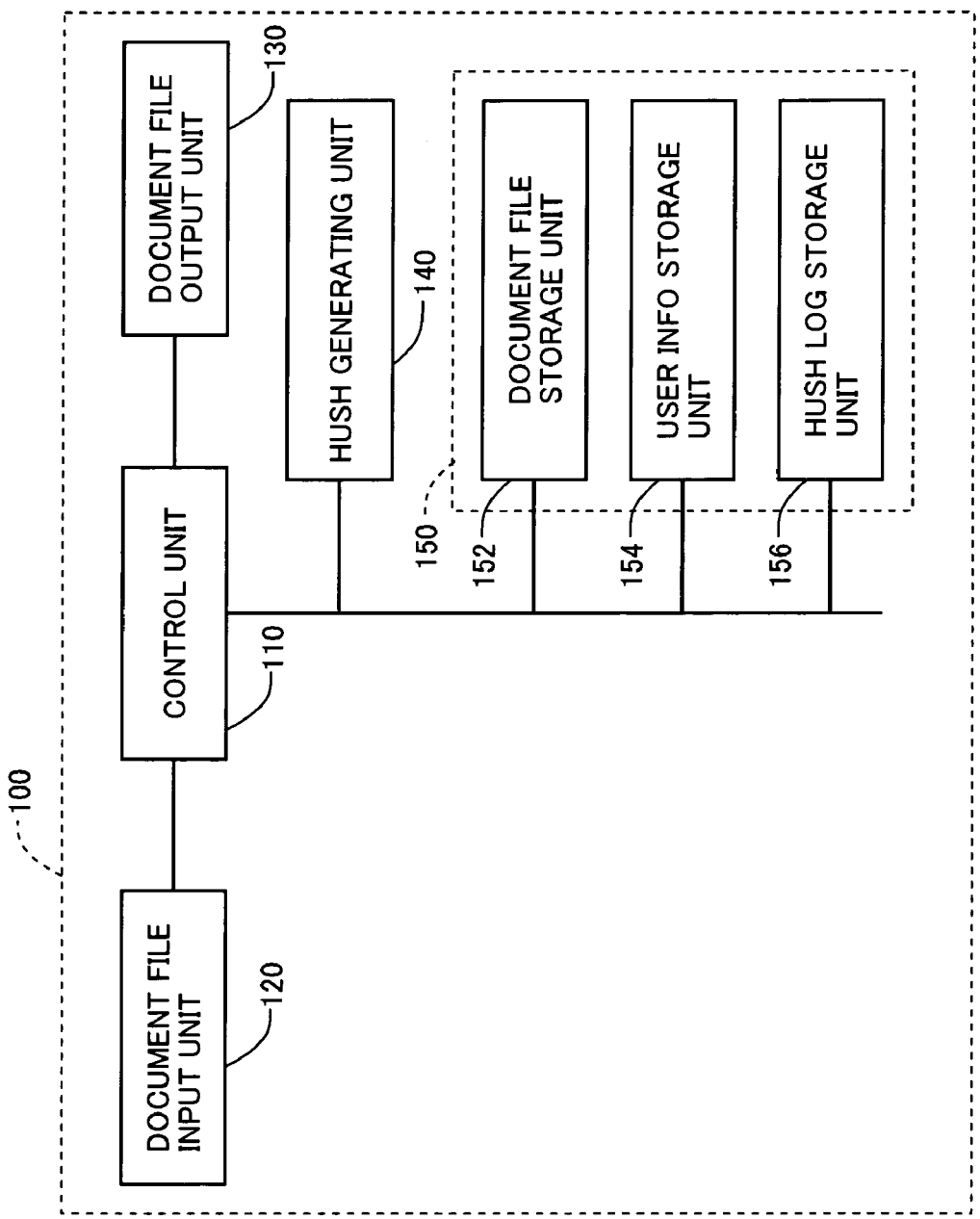
FIG. 2 is a functional block diagram showing hardware configuration of an image data processing apparatus 100 shown in FIG. 1.

FIG. 2 is a functional block diagram showing hardware configuration of image data processing apparatus 100. As shown in FIG. 2, image data processing apparatus 100 includes: a document file input unit 120 connected to LAN line 400 and to which image data from image processing terminal 200 is input (received); a document file output unit 130 connected to LAN line 400 and from which image data is output (transmitted) to image forming apparatus 300; a hash generating unit 140 calculating a hash value from the image data; a storage unit 150; and a control unit 110 controlling image data processing apparatus 100.

Control unit 110 is formed of a CPU (Central Processing Unit) and a memory storing variables or programs to be executed by the CPU. Specifically, the memory includes an ROM (Read Only Memory) for storing programs and the like, and an RAM (Random Access Memory) providing a memory area when a program is executed.

The ROM stores programs and data necessary for controlling operations of image data processing apparatus 100. The CPU executes control related to each function of image data processing apparatus 100 in accordance with the programs and data stored in the ROM.

Among the functions, image data processing apparatus 100 executes the registration process and the print process for the image data, as will be described later. In parallel with such programs, the CPU executes programs realizing general functions of a computer, in order to control image data processing apparatus 100. The programs, however, are not directly related to the essential characteristics of the present invention and, therefore, details thereof will not be described in the embodiment.

Hash generating unit 140 generates a hash value that is calculated by a one-way function (hash function), from the image data received from image processing terminal 200. The hash function may include "SHA-1" and "MD5", and hash generating unit 140 generates the hash value from the image data using such a hash function. Since the hash function is a one-way function, it is impossible to estimate the original image data from the generated hash value. The hash value represents unique data for each image data, and has far smaller capacity than the original image.

Storage unit 150 may be implemented by a flash memory or an HDD (Hard Disk Drive), which is a non-volatile storage area capable of storing data and the like even when power to image data processing apparatus 100 is turned off. The RAM provides a function of a working memory for temporarily storing results of operations and processes by the CPU, and it may also provide a function of a frame memory for temporarily storing image data.

Specifically, storage unit 150 includes: a document file storage unit 152 storing a document file (image data) itself, a user information storage unit 154 storing user information related to the user of the print service system; and a hash log storage unit 156 storing a hash log including the hash value generated by hash generating unit 140.

Referring to FIG. 3, the user information stored in user information storage unit 154 will be described. As shown in FIG. 3, the user information is stored in a user information storage table formed of at least a field for storing the user name and a field for storing a group ID to which the user belongs, with a user ID used as a key. Here, the group ID is a group identifier provided for each business operation unit, such as a division or section of a company. It is assumed that users belonging to the same business operation unit are seated close to each other.

As shown in FIG. 3, user ID "000001" indicates that the user name is "A" and the group ID is "001", user ID "000002" indicates that the user name is "B" and the group ID is "001", and user ID "000010" indicates that the user name is "F" and the group ID is "002". Thus, when two user IDs are known, it is possible to determine whether the users belong to the same group or different groups.

Referring to FIG. 4, the hash log information stored in hash log storage unit 156 will be described. As shown in FIG. 4, the hash log information is stored in a hash log storage table formed of at least a field for storing the user ID and a field for storing print-complete information, with a hash value used as a key. Here, the user ID is an identifier identifying the user who requested printing of the image data as a source of the hash value. As the print-complete information, "not yet" (or "0" in binary notation) is stored until the document is printed by any of the image forming apparatuses 300, and "printed" (or "1" in binary notation) is stored after the document is printed.

Image data processing apparatus 100 in accordance with the present embodiment has a function, when a print request of image data is received from image processing terminal 200 and it is known from the hash log information stored in hash log storage unit 156 that the image data has already been printed by a user belonging to the same group, of giving an alarm to that effect on image processing terminal 200, and of continuing registration of print request if a command requesting continuation of registration is nevertheless issued from image processing terminal 200. In order to realize such a function, image data processing apparatus 100 executes a program that has the following software configuration.

[Software Configuration]

Figure 5:
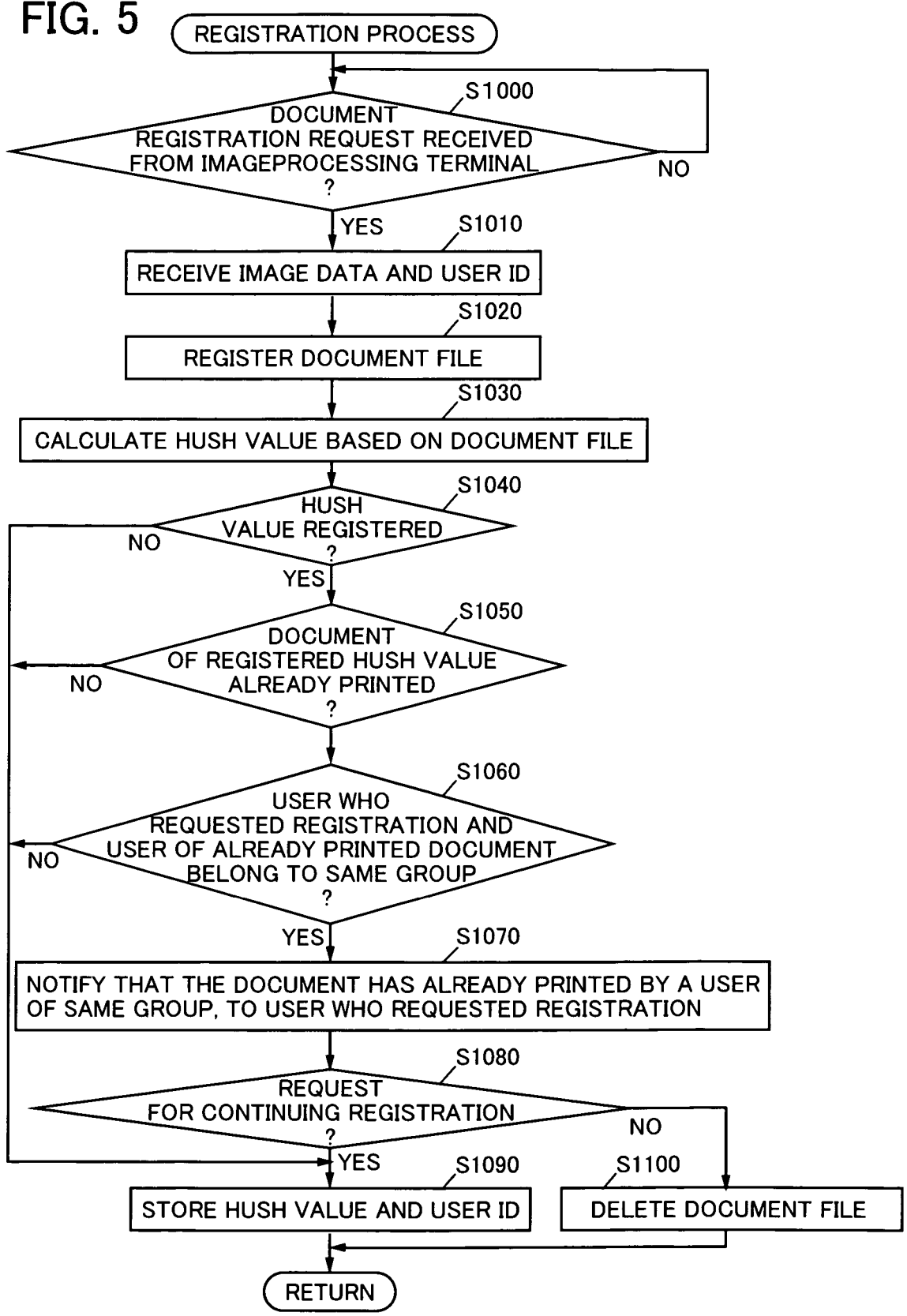
FIG. 5 is a flowchart representing a control structure of a registration process program for the image data, executed by a control unit shown in FIG. 2.
Figure 6:
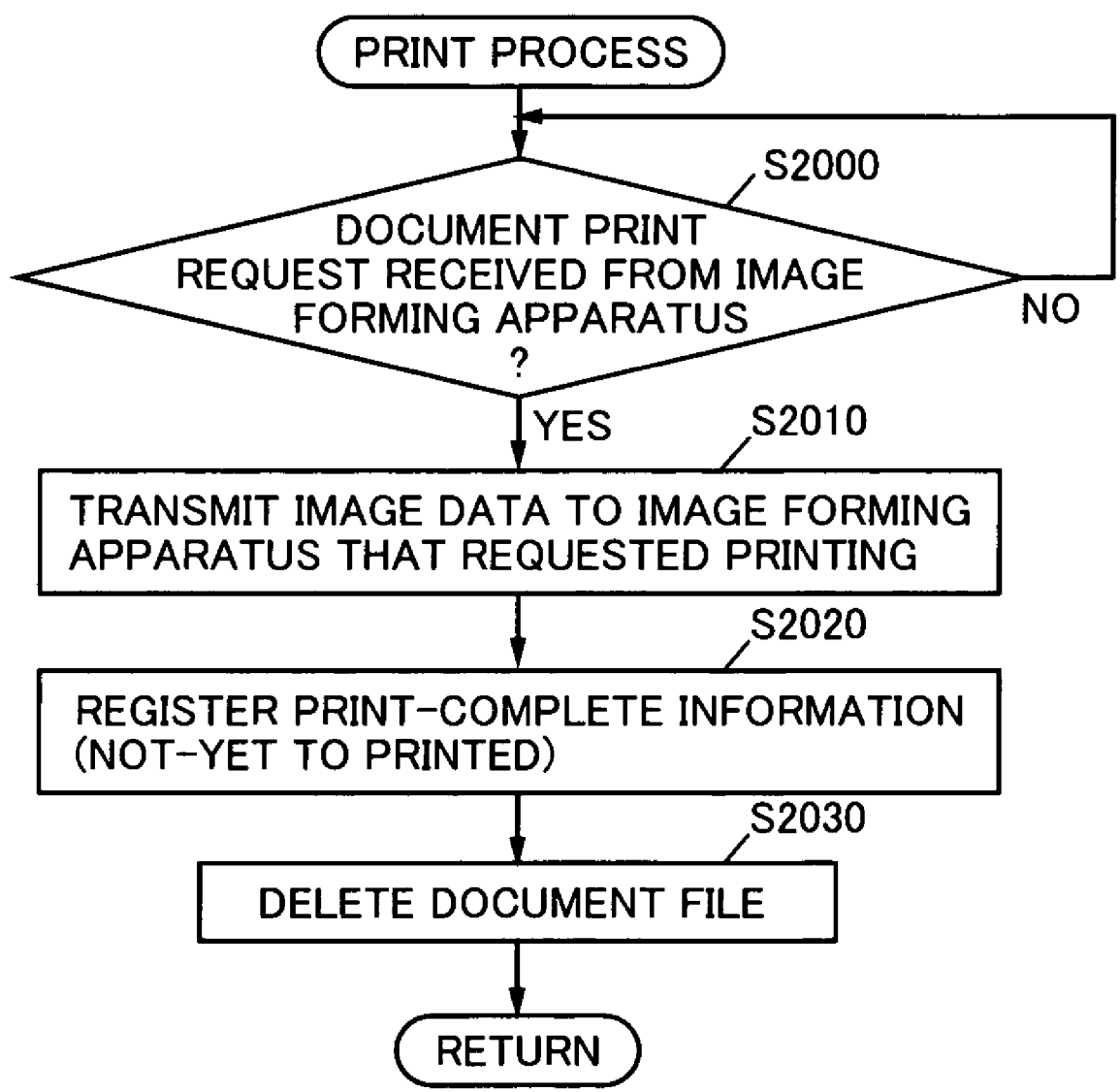
FIG. 6 is a flowchart representing a control structure of a print process program for the image data, executed by the control unit shown in FIG. 2.

FIGS. 5 and 6 are flowcharts representing control structures of a program for the image data registration process and the program for image data print process executed by image data processing apparatus 100. In parallel with such programs, control unit 110 of image data processing apparatus 100 executes programs for realizing general functions of a computer or an image forming apparatus. These programs, however, will not be discussed here, as mentioned above.

Referring to FIG. 5, at step (hereinafter, "step" will be denoted by "S") 1000, control unit 110 of image data processing apparatus 100 (hereinafter simply referred to as control unit 110) determines whether or not a document registration request is received from image processing terminal 200. At this time, if a user who has logged-in to image processing terminal 200 using his/her user ID designates a document file and issues a print request command on image processing terminal 200, control unit 110 determines that a document registration request has been received from image processing terminal 200. If it is determined that the document registration request has been received (YES at S1000), the process proceeds to S1010. Otherwise (NO at S1000), the process returns to S1000 to wait for reception of the document registration request from image processing terminal 200.

At S1010, control unit 110 receives image data and user ID from image processing terminal 200. At S1020, control unit 110 executes document file registration. Here, control unit 110 stores the document file (image data file) received from image processing terminal 200 in document file storage unit 152.

At S1030, control unit 110 calculates a hash value based on the received document file, using hash generating unit 140.

At S1040, control unit 110 determines whether or not the calculated hash value has already been registered. Here, control unit 110 determines whether the calculated hash value has already been registered or not depending on whether the hash value calculated at S1030 exists in the hash log information stored in hash log storage unit 156. If it is determined that the calculated hash value has already been registered (YES at S1040), the process proceeds to S1050. Otherwise (NO at S1040), the process proceeds to S1090.

At S1050, control unit 110 determines whether or not the document corresponding to the already registered hash value has been already printed. Here, control unit 110 determines whether or not the document corresponding to the already registered hash value has been already printed, based on the print-complete information corresponding to the hash value included in the hash log information stored in hash log storage unit 156. If it is determined that the document corresponding to the already registered hash value has been already printed (YES at S1050), the process proceeds to S1060. Otherwise (NO at S1050), the process proceeds to S1090.

At S1060, control unit 110 determines whether or not the user who requested registration belongs to the same group as the user of the already printed document. Here, control unit 110 extracts the user ID that corresponds to the hash value included in the hash log information stored in hash log storage unit 156 and, based on the user information stored in user information storage unit 154, extracts the group (first group) to which the user identified by the extracted user ID belongs. Control unit 110 extracts the group (second group) to which the user identified by the user ID received at S1010 belongs, from the user information stored in user information storage unit 154. If the first group and the second group match, control unit 110 determines that the user who requested registration belongs to the same group as the user of the document that has already been printed. If it is determined that the group of the user who requested registration is the same as the group of the user of the already printed document (YES at S1060), the process proceeds to S1070. Otherwise (NO at S1060), the process proceeds to S1090. It is noted that the group ID and the user ID are both received at S1010 and, in that case, control unit 110 performs this process using the received group ID.

At S1070, control unit 110 notifies the user who requested the document registration of the fact that the same document has been already printed by a user belonging to the same group. At this time, control unit 110 controls image data processing apparatus 100 such that the notification information is transmitted to image processing terminal 200 used by the user who requested the document registration.

At S1080, control unit 110 determines whether there is a request for continuing the document file registration. Specifically, control unit 110 determines whether or not a command requesting continuation of registration has been received from image processing terminal 200 to which the notification information has been transmitted. At this time, if the user of image processing terminal 200 viewing the notification information (the user who requested registration of image data) issues the command requesting continuation of document file registration process, control unit 110 determines that a document registration request is received from image processing terminal 200. If it is determined that there is a request for continuing document file registration (YES at S1080), the process proceeds to S1090. Otherwise (NO at S1080), the process proceeds to S1100.

At S1090, control unit stores the hash value and the user ID as hash log information in hash log storage unit 156. Then, "not-yet" is stored as the print-complete information. Thereafter, the process ends.

At S1100, control unit 100 deletes the document file from document file storage unit 152. Then, the process ends.

Referring to FIG. 6, at S2000, control unit 110 determines whether or not a document print request is received from image forming apparatus 300. If a print request command is issued designating a user ID on image forming apparatus 300, control unit 110 determines that a document print request is received from image forming apparatus 300. Here, it is assumed that one document for printing is stored for one user. If it is not the case, the print request command may be issued designating a user ID and a document file name. If it is determined that the document print request is received (YES at S2000), the process proceeds to S2010. Otherwise (NO at S2000), the process returns to S2000 to wait for reception of the document print request from image forming apparatus 300.

At S2010, control unit 110 transmits image data to image forming apparatus 300 that has transmitted the print request. At S2020, control unit 110 changes the print-complete information of hash log information stored in hash log storage unit 156 from "not-yet" to "printed" and thereby registers that printing is done.

At S2020, control unit 110 deletes the document file that has been stored in document file storage unit 152.

[Operation]

The operation of image data processing apparatus 100 in accordance with the present embodiment based on the structure and flowcharts above will be described in the following.

—Document Registration Operation (1)—

In the following, an operation when the same document has already been printed by a user of the same group will be described.

A user A belonging to group 001 logs-in image processing terminal 200 using his/her user ID, designates a document file (here, denoted as "Document A"), and issues a print request command. Image data processing apparatus 100 determines that a document registration request is received from image processing terminal 200 (YES at S1000).

From image processing terminal 200 to image data processing apparatus 100, the document file ("Document A") and the user ID are transmitted, and image data processing apparatus 100 receives these (S1010).

The document file received from image processing terminal 200 ("Document A") is stored in document file storage unit 152 (S1020). Based on the document file, a hash value is calculated (S1030). The hash value here is assumed to be the fourth value from the top of hash log information shown in FIG. 4. Specifically, the hash value that corresponds to "Document A" has already been registered in the hash log information, and "Document A" has already been printed by a user B who belongs to group 001.

The hash value that corresponds to "Document A" has already been registered in the hash log information (YES at S1040), "Document A" corresponding to the registered hash value has already been printed (YES at S1050), and the user A who requested document registration from image processing terminal 200 belongs to the same group 001 as user B of printed "Document A" (YES at S1060). Therefore, user A who requested document registration is notified of the fact that the same "Document A" has already been printed by user B who belongs to the same group 001.

At this time, on a monitor of image processing terminal 200 to which user A is logged-in, a notice such as shown in FIG. 7 is displayed. As can be seen from FIG. 7, a notice "DOCUMENT A REQUESTED BY USER A FOR PRINTING IS ALREADY PRINTED BY USER B OF THE SAME GROUP. CONTINUE PRINT REGISTRATION OF DOCUMENT A?" is presented to user A.

If the user A still requests to continue document registration even after such a notice is displayed (YES at S1080), the document file ("Document A") is kept stored in document file storage unit 152 while the hash value and the user ID are stored as hash log information, in hash log storage unit 156 (S1090). In print-complete information, "not-yet" is stored.

If such a notice is displayed and user A does not request document registration (NO at S1080), the hash log information is not stored in hash log storage unit 156, and the document file ("Document A") is deleted from document file storage unit 152 (S1100).

—Document Registration Operation (2)—

In the following, an operation when the same document is not registered, not yet printed, or printed by a user of a different group will be described.

Here, if the hash value that corresponds to the document of which printing has been requested by the user is not yet registered in the hash log information (NO at S1040), registered but not yet printed (NO at S1050), or printed but the user who requested document registration from image processing terminal 200 belongs to a group different from the group of the user of already printed document (NO at S1060), then, without any notice to user A who requested document registration, the document file is kept stored in document file storage unit 152 while the hash value and the user ID are stored as the hash log information in hash log storage unit 156 (S1090). In the print-complete information, "not-yet" is stored.

—Document Print Operation—

When image forming apparatus 300 issues a print request command designating a user ID, image data processing apparatus 100 determines that a document registration request is received from image forming apparatus 300 (YES at S2000).

From image data processing apparatus 100, the image data is transmitted to the image forming apparatus 300 that has requested printing (S2010), and the document is printed by image forming apparatus 300. When printing is done, the print-complete information in hash log information stored in hash log storage unit 156 is changed from "not-yet" to "printed." Thereafter, the document file that has been stored in document file storage unit 152 is deleted (S2030).

As described above, by the print service system in accordance with the present embodiment, image data is transmitted from an image processing terminal such as a PC through a network to the image data processing apparatus on the network, and printing process is executed when a print request command is issued from an image forming apparatus (printer) to the image data processing apparatus. In such a situation, if the same document (image) has been already printed by a user of the same group, a notice to that effect is given to a user who requested printing. Receiving such a notice, the user may refrain from printing, since it may be sufficient to refer to the previously provided print-out (since it is often the case that the user belonging to the same group stays nearby) if the purpose is just a rough confirmation of printed image (color, tone and overall balance). In that case, the image data is deleted and, therefore, it is unnecessary to increase the capacity of an image memory. This approach effectively prevents accumulative printing of the same image and cuts waste.

As regards the hash value generated from the image data, the hash value may be generated regarding the image data as a whole as one image data, or if the image data contains a plurality of pages, a hash value may be generated for each page.

In the embodiment above, the process of S1070 is executed if conditions of S1040, S1050 and S1060 are satisfied. The condition of S1060, however, may be omitted. In that case, if the document has already been printed (regardless of the group), a notice to that effect is given to the user who requested print registration.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image data processing apparatus used in a print system in which image data to be printed is transmitted from an image processing terminal to said image data processing apparatus on a network, and printing process is executed by an image forming apparatus when a print request command is issued from said image forming apparatus to said image data processing apparatus, comprising:
   a data storage unit storing image data received from said image processing terminal;
   a generating unit generating identification data enabling unique identification of said image data, based on said stored image data;
   an information storage unit storing said identification data in relation to user information identifying a user who requested printing process of the image data from which said identification data is derived and print information indicating whether or not printing has been done; and
   a control unit, upon reception of said image data from said image processing terminal, for generating the identification data from said image data, and if said generated identification data matches previously generated identification data which has been stored in said information storage unit and printing of the image data associated with the previously generated identification data has already been done, issuing alarm information to said image processing terminal so that an alarm is output on said image processing terminal.

2. The image data processing apparatus according to claim 1, wherein
   said generation unit generates said identification data from said image data, using a one-way function.

3. The image data processing apparatus according to claim 2, wherein
   said one-way function is a hash function.

4. The image data processing apparatus according to claim 3, wherein
   said generation unit generates, if said image data contains a plurality of pages, a hash value calculated by using the hash function for each page, as said identification information.

5. The image data processing apparatus according to claim 1, further comprising
   a unit for storing a group to which said user belongs; wherein
   said control unit issues said alarm information to said image processing terminal, if said generated identification data is stored in said information storage unit and printing has been already done by a user of the same group.

6. The image data processing apparatus according to claim 5, wherein
   said alarm information indicates that printing has been done by a user belonging to the same group.

7. The image data processing apparatus according to claim 1, wherein
   said alarm information allows input as to whether or not processing is to be continued;
   said image data processing apparatus further comprising
   a unit controlling said information storage unit such that, when a reply to continue processing is received, said identification data is stored in relation to user information and print information, in said information storage unit.

8. The image data processing apparatus according to claim 7, wherein
said print information indicates printing is not yet done.

9. The image data processing apparatus according to claim 1, wherein
said alarm information allows input as to whether or not processing is to be continued;
said image data processing apparatus further comprising
a unit for deleting image data stored in said data storage unit, when a reply not to continue processing is received.

10. The image data processing apparatus according to claim 1, further comprising
a unit for transmitting, when a print request is received from said image forming apparatus, the image data stored in said data storage unit to the image forming apparatus that has transmitted said print request, and deleting said image data stored in said data storage unit after transmission.

11. The image data processing apparatus according to claim 1, further comprising
a unit for transmitting, when a print request is received from said image forming apparatus, the image data stored in said data storage unit to the image forming apparatus that has transmitted said print request, and changing the print information that printing is not yet done to information that printing has been done after transmission.

* * * * *